United States Patent
Moon et al.

(10) Patent No.: US 12,314,008 B2
(45) Date of Patent: May 27, 2025

(54) HOLOGRAPHIC DISPLAY SYSTEM AND METHOD FOR GENERATING HOLOGRAM BY COMPENSATING FOR ABERRATION OF HOLOGRAPHIC DISPLAY DEVICE

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Seokil Moon, Suwon-si (KR); Dongheon Yoo, Seoul (KR); Seungwoo Nam, Seoul (KR); Byoungho Lee, Seoul (KR); Changkun Lee, Seoul (KR); Hongseok Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 653 days.

(21) Appl. No.: 17/536,511

(22) Filed: Nov. 29, 2021

(65) Prior Publication Data
US 2022/0299939 A1    Sep. 22, 2022

(30) Foreign Application Priority Data
Mar. 22, 2021  (KR) .......................... 10-2021-0036806

(51) Int. Cl.
*G03H 1/08*    (2006.01)
*G06T 5/20*    (2006.01)
(Continued)

(52) U.S. Cl.
CPC ............. *G03H 1/0866* (2013.01); *G06T 5/20* (2013.01); *G06T 5/50* (2013.01); *G06T 5/80* (2024.01); *G03H 2226/02* (2013.01)

(58) Field of Classification Search
CPC ............ G03H 1/0866; G03H 2226/02; G03H 2001/0825; G03H 1/0808; G03H 1/2294;
(Continued)

(56) References Cited

U.S. PATENT DOCUMENTS

| | | | |
|---|---|---|---|
| 10,895,842 | B2 | 1/2021 | Chang |
| 2006/0139711 | A1 | 6/2006 | Leister et al. |

(Continued)

FOREIGN PATENT DOCUMENTS

| | | |
|---|---|---|
| KR | 10-2009-0011973 A | 2/2009 |
| KR | 10-2015-0127698 A | 11/2015 |
| KR | 10-2019-0078211 A | 7/2019 |

OTHER PUBLICATIONS

Colomb et al., "Numerical parametric lens for shifting, magnification, and complete aberration compensation in digital holographic microscopy", 2006, J. Opt. Soc. Am. A., vol. 23, Issue 12, 14 pages total, XP007901432.

(Continued)

*Primary Examiner* — Jared Walker
(74) *Attorney, Agent, or Firm* — Sughrue Mion, PLLC

(57) ABSTRACT

Provided are holographic display systems and methods for generating a hologram by compensating for aberrations of a holographic display device. The holographic display system may include a holographic display device and a hologram generating device. The hologram generating device may generate a hologram by propagating hologram segments, using kernels generated by modeling each aberration corresponding to each of hologram plane segments to compensate for aberrations.

21 Claims, 11 Drawing Sheets

(51) Int. Cl.
*G06T 5/50* (2006.01)
*G06T 5/80* (2024.01)

(58) Field of Classification Search
CPC .... G03H 1/041; G03H 1/0406; G03H 1/0443; G03H 1/0891; G06T 5/20; G06T 5/50; G06T 5/80; G06T 2207/20021
See application file for complete search history.

(56) References Cited

U.S. PATENT DOCUMENTS

| | | | |
|---|---|---|---|
| 2009/0219589 A1* | 9/2009 | Ikeda | G03H 1/0841 359/9 |
| 2010/0045775 A1* | 2/2010 | Haussler | G03H 1/26 359/32 |
| 2013/0107336 A1* | 5/2013 | Wey | G03H 1/0808 359/9 |
| 2014/0268277 A1 | 9/2014 | Georgiou et al. | |
| 2016/0027215 A1* | 1/2016 | Burns | G02B 27/0103 345/626 |
| 2016/0223987 A1* | 8/2016 | Park | G03H 1/0808 |
| 2018/0046140 A1* | 2/2018 | Smithwick | G03H 1/2294 |
| 2020/0293108 A1 | 9/2020 | Georgeiou et al. | |

OTHER PUBLICATIONS

Communication issued Jun. 22, 2022 by the European Patent Office for European Patent Application No. 21218405.5.
Liu, Shujian et al., "Optimization of Phase-Only Computer-Generated Holograms Based on the Gradient Descent Method", Applied Science, Jun. 22, 2020, vol. 10, No. 4283, pp. 1-14.
Jaebum Chung et al., "Computational aberration compensation by coded-aperture-based correction of aberration obtained from optical Fourier coding and blur estimation", Optica, vol. 6, Issue 5, May 2019, pp. 647-661, DOI: 10.1364/OPTICA.6.000647.
Communication issued Feb. 18, 2025 from the Korean Intellectual Property Office for Korean Patent Application No. 10-2021-0036806.

* cited by examiner

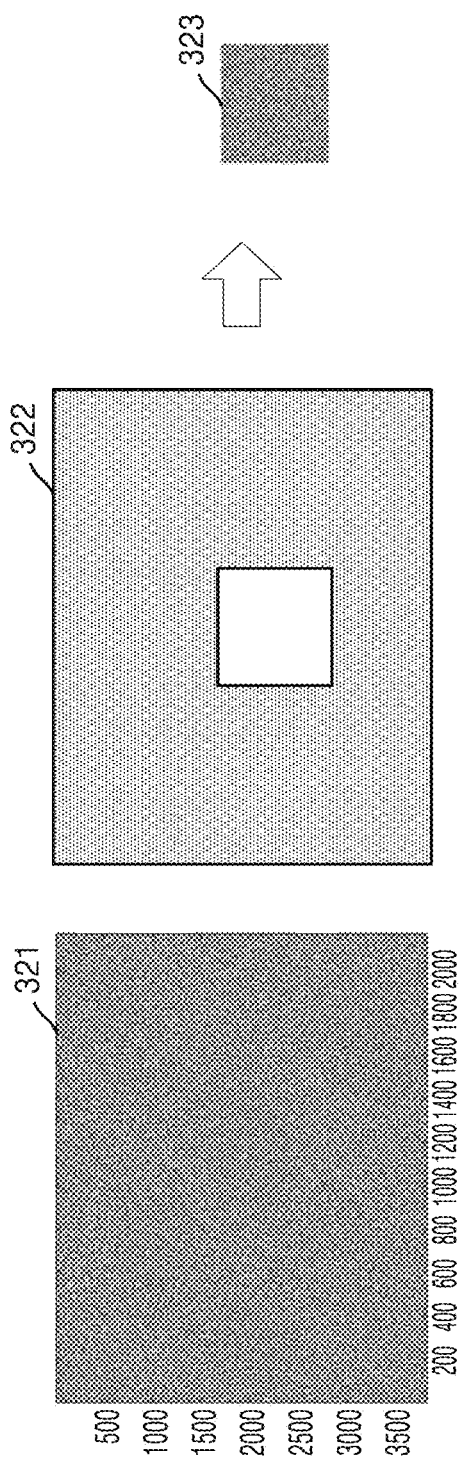

HOLOGRAPHIC DISPLAY SYSTEM AND METHOD FOR GENERATING HOLOGRAM BY COMPENSATING FOR ABERRATION OF HOLOGRAPHIC DISPLAY DEVICE

CROSS-REFERENCE TO RELATED APPLICATION

This application is based on and claims priority under 35 U.S.C. § 119 to Korean Patent Application No. 10-2021-0036806, filed on Mar. 22, 2021, in the Korean Intellectual Property Office, the disclosure of which is incorporated by reference herein in its entirety.

BACKGROUND

1. Field

The disclosure relates to holographic display systems and methods for generating a hologram by compensating for aberrations of a holographic display device.

2. Description of the Related Art

Holography is a technology of recording three-dimensional images by using the interference phenomenon which occurs when an object beam reflected from an object meets a reference beam. A hologram is a record of interference patterns by holography. Holography may be classified into analog holography and digital holography. Analog holography refers to a technology of directly recording interference patterns of an object beam and a reference beam. Digital holography refers to a technology of generating interference patterns of an object beam and a reference beam by using digital processing.

Computer generated holography (CGH) is a kind of digital holography. In CGH, a hologram is generated by calculating interference patterns by a computer. A three-dimensional image is reproduced by displaying a hologram by a holographic display device.

Due to optical aberrations of the holographic display device, the quality of the three-dimensional image may be degraded, and thus, a method for preventing such degradation is required.

SUMMARY

Provided are holographic display systems and methods for generating a hologram by compensating for aberrations of a holographic display device. Provided are computer-readable recording media on which a program for executing the method in a computer is recorded. The technical task to be solved is not limited to the foregoing, and other technical tasks may also exist.

Additional aspects will be set forth in part in the description which follows and, in part, will be apparent from the description, or may be learned by practice of the presented example embodiments of the disclosure.

According to an aspect of the disclosure, there is provided a method for generating a hologram, the method comprising: generating kernels by modeling aberrations corresponding to hologram plane segments of a hologram plane; generating masks corresponding to the hologram plane segments of the hologram plane; obtaining hologram segments by spatial filtering the hologram by using the masks; obtaining first image segments by propagating the hologram segments by using the kernels; and updating the hologram based on a comparison between the first image segments and second image segments.

The generating of the kernels may comprise: modeling the aberrations corresponding to the hologram plane segments using Zernike polynomials; and generating each of the kernels based on each of the Zernike polynomials.

The modeling of the aberrations corresponding to the hologram plane segments using each of the Zernike polynomials may comprise determining Zernike coefficients for at least one hologram plane segment, among the hologram plane segments, by interpolating Zernike coefficients modeled for neighboring hologram plane segments, among the hologram plane segments.

The generating of the kernels may comprise: generating divided hologram plane segments by dividing at least one hologram plane segment among the hologram plane segments; and generating the kernels based on the divided hologram plane segments.

The generating of the kernels may comprise: generating a merged hologram plane segment by merging at least two hologram plane segments among the hologram plane segments; and generating a kernel, among the kernels, based on the merged hologram plane segment.

The generating of the masks may comprise generating at least one mask including a pass area corresponding to a respective hologram plane segment and a remainder cut-off area.

The generating of the masks may further comprise generating at least one mask where an edge area of the pass area has a different pixel value than a central area of the pass area.

The generating of the masks may further comprise generating at least one mask where a first edge area of the pass area, which adjoins the cut-off area, has a different pixel value than a central area of the pass area, and a second edge area of the pass area, which does not adjoin the cut-off area, has a same pixel value as the central area of the pass area.

The obtaining of the first image segments may comprise obtaining the first image segments by propagating the hologram segments in parallel.

The updating of the hologram may comprise: determining a loss function based on a difference in intensities of the first image segments and the second image segments; and updating the hologram to optimize the loss function.

The hologram plane segments are spatial segments of the hologram plane.

The second image segments are reference image segments acquired from a storage.

According to another aspect of the disclosure, there is provided a non-transitory computer-readable recording medium having recorded thereon a computer program for executing a method for generating a hologram, the method comprising: generating kernels by modeling aberrations corresponding to hologram plane segments of a hologram plane; generating masks corresponding to the hologram plane segments of the hologram plane; obtaining hologram segments by spatial filtering the hologram by using the masks; obtaining first image segments by propagating the hologram segments by using the kernels; and updating the hologram based on a comparison between the first image segments and second image segments.

According to another aspect of the disclosure, there is provided a holographic display system comprising: a light source configured to emit light to reproduce a holographic image; an optical system configured to spatially focus the holographic image; a processor configured to generate a hologram configured to reproducing the holographic image;

and a spatial light modulator configured to modulate the light based on the hologram, wherein the processor is configured to: generate kernels by modeling each aberration corresponding to each of hologram plane segments of a hologram plane; generate masks respectively corresponding to the hologram plane segments of the hologram plane; obtain hologram segments by spatial filtering the hologram by using the masks; obtain first image segments by propagating the hologram segments by using the kernels; and update the hologram based on a comparison between the first image segments and second image segments.

The processor may be further configured to perform the modeling of the aberrations corresponding to the hologram plane segments using Zernike polynomials, and generate each of the kernels based on each of the Zernike polynomials.

The processor may be further configured to determine Zernike coefficients for at least one hologram plane segment, among the hologram plane segments, by interpolating Zernike coefficients modeled for neighboring hologram plane segments, among the hologram plane segments.

The processor may be further configured to generate divided hologram plane segments by dividing at least one hologram plane segment, among the hologram plane segments, and generate the kernels based on the divided hologram plane segments.

The processor may be further configured to generate a merged hologram plane segment by merging at least two hologram plane segments, among the hologram plane segments, and generate a kernel, among the kernels, based on the merged hologram plane segment, among the hologram plane segments.

The processor may be further configured to generate at least one mask including a pass area corresponding to a respective hologram plane segment and a remainder cut-off area.

The processor may be further configured to generate at least one mask where an edge area of the pass area has a different pixel value than a central area of the pass area.

The processor may be configured to obtain the first image segments by propagating the hologram segments in parallel.

The processor may be further configured to determine a loss function based on a difference in intensities of the first image segments and the second image segments, and update the hologram to optimize the loss function.

According to another aspect of the disclosure, there is provided a holographic display device comprising: a memory storing one or more instructions; and a processor configured to execute the one or more instructions to: generate one or more kernels corresponding to one or more hologram plane segments of a hologram plane; generate one or more masks corresponding to the one or more hologram plane segments; obtain one or more hologram segments by applying the one or more masks on a hologram; obtain one or more image segments by propagating the hologram segments based on the one or more kernels; and update the hologram based on a comparison between the one or more image segments and one or more reference image segments.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3B illustrates a hologram and hologram segments according to an example embodiment;

DETAILED DESCRIPTION

Figure 1:
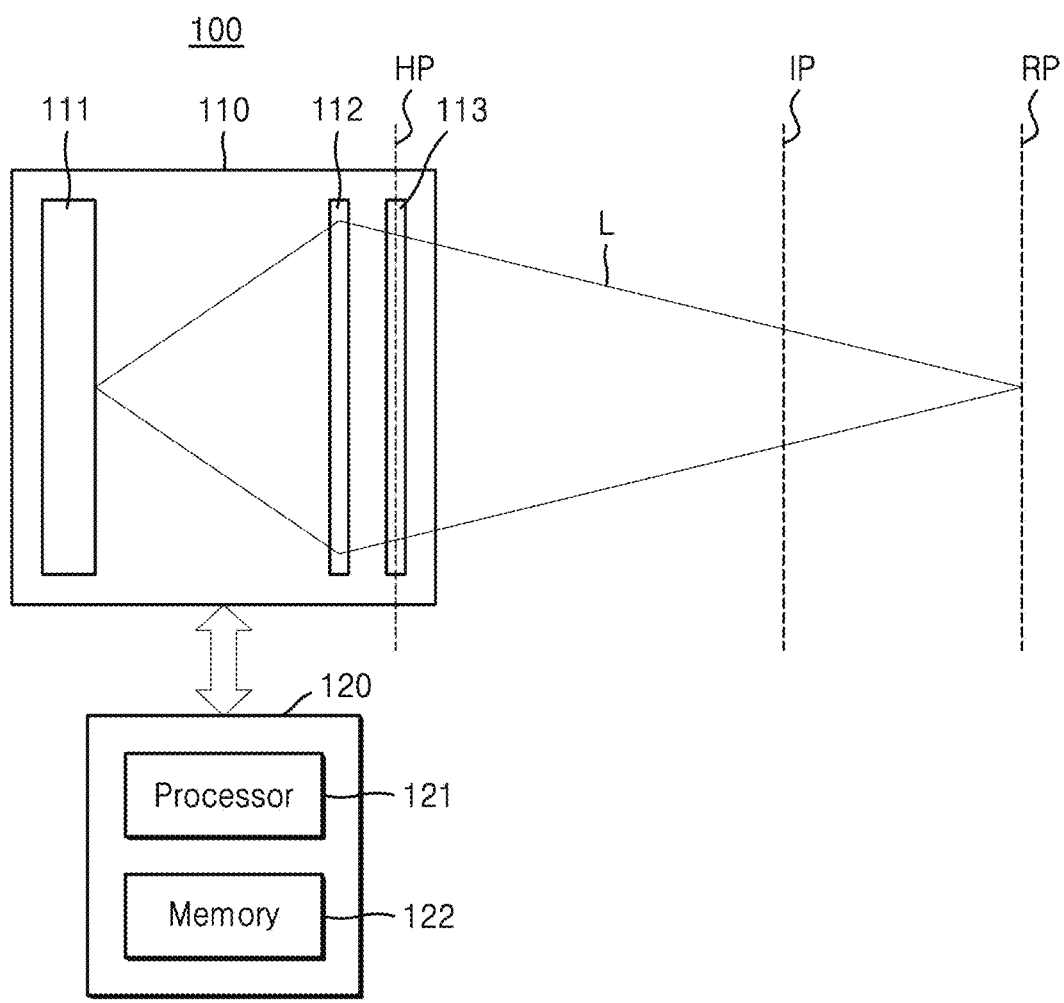
FIG. 1 is a block diagram schematically showing a holographic display system according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

General terms which are widely used are selected to describe example embodiments; however, such terms may change according to an intent of a person engaged in the art, precedents, the advent of new technologies, etc. Also, in certain cases, the applicant may arbitrarily select terms, and in such case, meanings of the terms will be described in detail in corresponding sections. Therefore, the term used in the specification shall be defined based on their meanings and overall description of the specification, not simply by their names.

In example embodiments, the terms such as "including," "comprising," etc. shall not be construed as including all of various components or operations described in the present specification, and it is to be understood that some of the components or operations may not be included, or other additional components or operations may be further included.

Hereinafter, example embodiments will be described in detail with reference to the attached drawings. However, example embodiments may be implemented in many different forms and should not be construed as being limited to examples described herein.

FIG. 1 is a block diagram schematically showing a holographic display system 100 according to an example embodiment.

The holographic display system 100 according to an example embodiment may include a holographic display device 110 and a hologram generating device 120. The holographic display device 110 may include a light source 111, an optical system 112, and a spatial light modulator 113. Further, the hologram generating device 120 may include a processor 121 and a memory 122.

The holographic display system 100 may be configured to generate a hologram and reproduce a holographic image based on a hologram plane HP located on the spatial light modulator 113, a reference plane RP located at the pupils of an observer, and an image plane IP, on which the holographic image is located.

The holographic display device 110 may be configured to display a holographic image on the image plane IP based on a hologram provided from the hologram generating device 120. The image plane IP may include multiple layers.

The light source 111 may be configured to emit light to reproduce a holographic image. The light source 111 may include a laser diode or a light emitting diode, but the disclosure is not limited thereto. For example, according to an example embodiment, the light source 111 may include an array of multiple light sources. According to another example embodiment, the light source 111 may include both a laser diode and a light emitting diode The optical system 112 may be configured to spatially focus a holographic image. The optical system 112 may be configured to spatially focus reproduction light L formed through modulation by the spatial light modulator 113. For example, the optical system 112 may be configured to focus the reproduction light L on the reference plane RP.

The optical system 112 may include a fixed focus optical system having a fixed focal distance or a variable focus optical system having a variable focal distance. According to an example embodiment, the optical system 112 may include a combination of fixed focus optical systems and variable focus optical systems. In addition, the optical system 112 may include a refractive lens element or a diffractive lens element. According to an example embodiment, the optical system 112 may include a combination of a refractive lens element and a diffractive lens element.

The spatial light modulator 113 may be configured to modulate light based on a hologram. The spatial light modulator 113 may form a hologram pattern for modulating light by diffraction based on a hologram provided from the hologram generating device 120. The spatial light modulator 113 may include an amplitude modulator and/or a phase modulator.

The hologram generating device 120 may be configured to generate a hologram. The hologram generating device 120 may be configured to generate a hologram based on computer generated holography (CGH). The hologram generating device 120 may be configured to generate a hologram by compensating for aberrations of the holographic display device 110. Specifically, the hologram generating device 120 may be configured to generate a hologram by compensating for aberrations of the optical system 112.

The processor 121 may be configured to generate a hologram. The processor 121 may be implemented by an array of multiple logic gates, and may be implemented by a combination of a general purpose micro-processor with a memory in which a program executable in the general purpose micro-processor is stored.

The processor 121 may generate masks respectively corresponding to hologram plane segments, which are spatial segments of the hologram plane HP. The processor 121 may generate kernels by modeling each aberration corresponding to each of the hologram plane segments. The processor 121 may obtain hologram segments by spatial filtering a hologram by using the masks. The processor 121 may obtain the image segments by propagating the hologram segments to the image plane by using the kernels. The processor 121 may update the hologram based on a comparison between the image segments and predetermined image segments.

The memory 122 may be configured to store holograms and/or programs executed by the processor 121. The memory 122 may include random access memory (RAM), such as dynamic random access memory (DRAM) and static random access memory (SRAM), read-only memory (ROM), electrically erasable programmable read-only memory (EEPROM), a CD-ROM, a blu-ray disc, or other optical disc storages, a hard disk drive (HDD), a solid state drive (SSD), or flash memory. Further, it may include other external storage devices which may be accessed by the hologram generating device 120.

Figure 2:
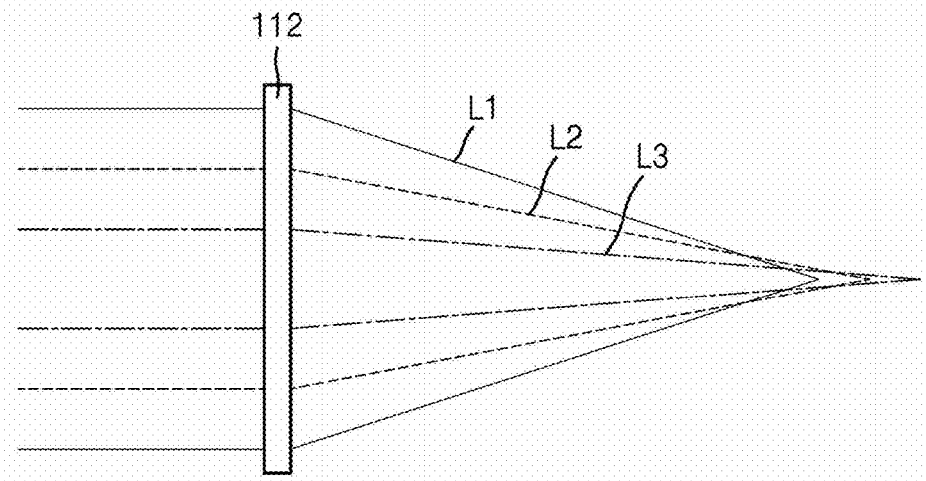
FIG. 2 is a cross-sectional diagram illustrating an example of aberrations of an optical system.

FIG. 2 is a cross-sectional diagram illustrating an example of aberrations of an optical system 112.

The holographic display device may have aberrations. Here, the aberrations may refer to all optical aberrations that may occur due to wave characteristics of light and/or a holographic display device. For example, the aberrations may include spherical aberration, astigmatism, coma, distortion, and/or curvature of field, but the disclosure is not limited thereto.

For example, due to spherical aberration, focal positions of light L1, light L2, and light L3 diffracted in the optical system 112 may be different. As a holographic image may be reproduced blurredly due to aberrations, a method for compensating for aberrations is required.

Figure 3A:
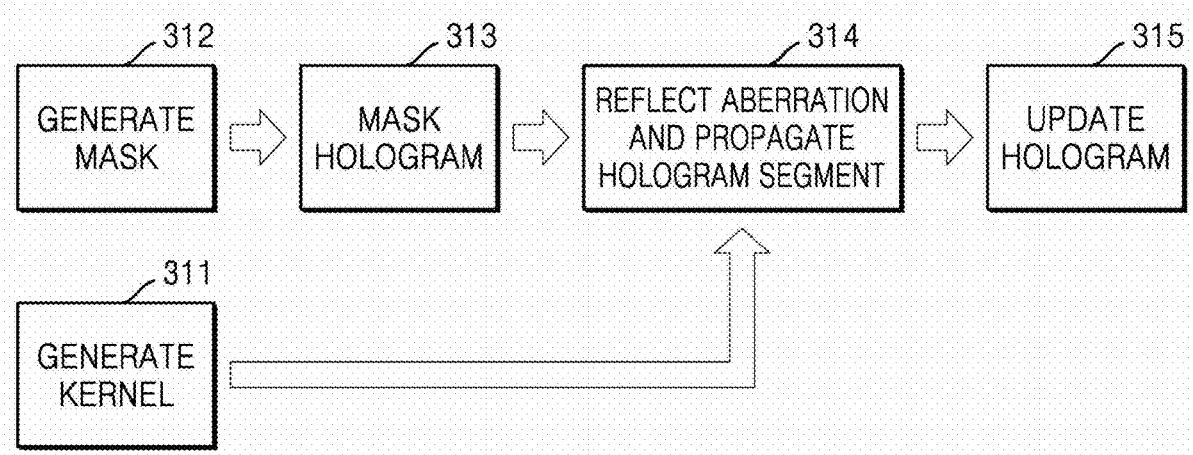
FIG. 3A illustrates a method for generating a hologram by compensating for aberrations of a holographic display device according to an example embodiment.

FIG. 3A illustrates a method for generating a hologram by compensating for aberrations of a holographic display device according to an example embodiment.

In operation 311, the processor may generate kernels. The aberration of the holographic display device may not appear uniformly on the hologram plane. To model the aberrations more accurately, it is required to model each aberration corresponding to each of the hologram plane segments. According to an example embodiment, the hologram plane segments are spatial segments of the hologram plane. To this end, the processor may generate kernels, which allows the modeling of aberrations respectively corresponding to the hologram plane segments. Zernike polynomials may be used for the modeling of the aberrations. The modeling of the aberrations may be performed with high accuracy through spatial division for the modeling.

In operation 312, the processor may generate masks. The processor may generate masks respectively corresponding to the hologram plane segments.

In operation 313, the processor may mask a hologram. That is, in operation 313, the processor may apply the mask generated in operation 312 to the hologram. According to the masking of the hologram, hologram segments respectively corresponding to the hologram plane segments may be generated. With reference to FIG. 3B, for example, a hologram segment 323 may be generated by filtering a hologram 321 by a mask 322.

Referring to FIG. 3A, in operation 314, the processor may reflect aberrations and propagate the hologram segment. The aberration corresponding to the hologram plane segment may be modeled in the kernel. Accordingly, by propagating the hologram segment using the kernel, the aberration corresponding to the hologram plane segment may be reflected and the hologram segment may be propagated. As the hologram segment is propagated, an image segment may be generated.

In operation 315, the processor may update a hologram. The processor may update the hologram based on a comparison between the image segment and a reference image segment. The reference image segment may be a predetermined image segment. According to an example embodiment, the reference image segments may be previously stored in a storage, and acquired from the storage while performing the comparison. The predetermined image segment may be generated by spatially dividing a predetermined image. The predetermined image may be spatially divided same as the hologram plane. A loss function may be used for updating a hologram. In an example embodiment, the loss function may be determined from a difference in intensities of the image segment and the predetermined image segment. A process of repeating operations 313 to 315 may be performed using an updated hologram to optimize the loss function.

Figure 4:
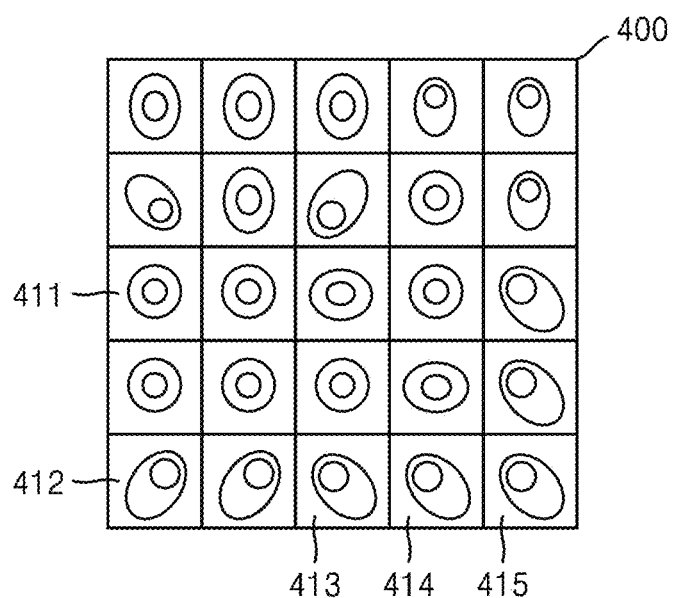
FIG. 4 illustrates patterns formed on hologram plane segments by aberrations according to an example embodiment.

FIG. 4 illustrates patterns formed on hologram plane segments by aberrations according to an example embodiment.

A hologram plane 400 may be divided into hologram plane segments. FIG. 4 illustrates a case in which the hologram plane 400 is divided into hologram plane segments of a 5×5 array. The hologram plane 400 may be divided into various numbers and sizes of hologram plane segments.

The aberration of the holographic display device may not affect the hologram plane 400 uniformly in spatial terms. As a result, when light is propagated to each hologram plane segment from each point light source, different patterns may appear in each hologram plane segment.

The processor may generate kernels in which aberrations respectively corresponding to the hologram plane segments are modeled. For example, the processor may generate a kernel in which aberration corresponding to a hologram plane segment 411 is modeled and a kernel in which aberration corresponding to a hologram plane segment 412 is modeled.

The processor may perform modeling of aberrations respectively corresponding to the hologram plane segments using Zernike polynomials, and generate kernels based on each Zernike polynomial. In an embodiment, the kernels may be modeled as the following Equation 1.

$$h_i = B(r) W_i \quad \text{[Equation 1]}$$

In Equation 1, $h_i$ represents a kernel corresponding to the $i^{th}$ hologram plane segment, $B(r)$ represents a function in which a basic wavefront of optical propagation is modeled, $r$ represents a propagation distance, and $W_i$ represents a function in which a wavefront due to aberration corresponding to the $i^{th}$ hologram plane segment is modeled. For example, in the case of optical propagation by a spherical wave, $B(r)$ may be modeled as $\exp(jkr)/r$. Here, "exp" refers to exponential.

The function $W_i$ of the wavefront by aberration may be modeled as the following Equation 2.

$$W_i = \exp(j\pi \Sigma \alpha_j Z_j) \quad \text{[Equation 2]}$$

In Equation 2, α represents Zernike coefficients, Z represents Zernike polynomials, and j represents indexes of Zernike polynomials. The indexes of Zernike polynomials may be determined by various criteria. For example, the OSA/ANSI index, Fringe index, Noll index, Wyant index, etc. may be used as the indexes of Zernike polynomials.

Table 1 shows various examples of Zernike polynomials according to the OSA/ANSI index.

TABLE 1

| J | Z |
|---|---|
| 0 | 1 |
| 1 | $2\rho\sin\varphi$ |
| 2 | $2\rho\cos\varphi$ |
| 3 | $\sqrt{6}\rho^2\sin2\varphi$ |
| 4 | $\sqrt{3}(2\rho^2 - 1)$ |
| 5 | $\sqrt{6}\rho^2\cos2\varphi$ |
| 6 | $\sqrt{8}\rho^3\sin3\varphi$ |
| 7 | $\sqrt{8}(3\rho^3 - 2\rho)\sin\varphi$ |
| 8 | $\sqrt{8}(3\rho^3 - 2\rho)\cos\varphi$ |
| 9 | $\sqrt{8}\rho^3\cos3\varphi$ |

In Table 1, φ represents an azimuthal angle, and ρ represents a radial distance. A wavefront having a more complicated shape may be modeled when Zernike polynomials are formed by using higher indexes.

The processor may be configured to determine the indexes and/or coefficients of Zernike polynomials by using a program analyzing aberrations. Alternatively, the processor may generate kernels by obtaining the indexes and/or coefficients of Zernike polynomials from a user input.

The processor may determine a Zernike coefficient for at least one hologram plane segment by interpolating Zernike coefficients, which have been modeled for neighboring hologram plane segments. For example, the processor may determine a Zernike coefficient of a hologram plane segment 414 by interpolating Zernike coefficients of hologram plane segments 413 and 415 neighboring the hologram plane segment 414. By obtaining Zernike coefficients through interpolation, the calculation time may be reduced. Further, by obtaining Zernike coefficients through interpolation based on spatial adjacency, the accuracy in the aberration modeling may not be diminished.

Figure 5A:
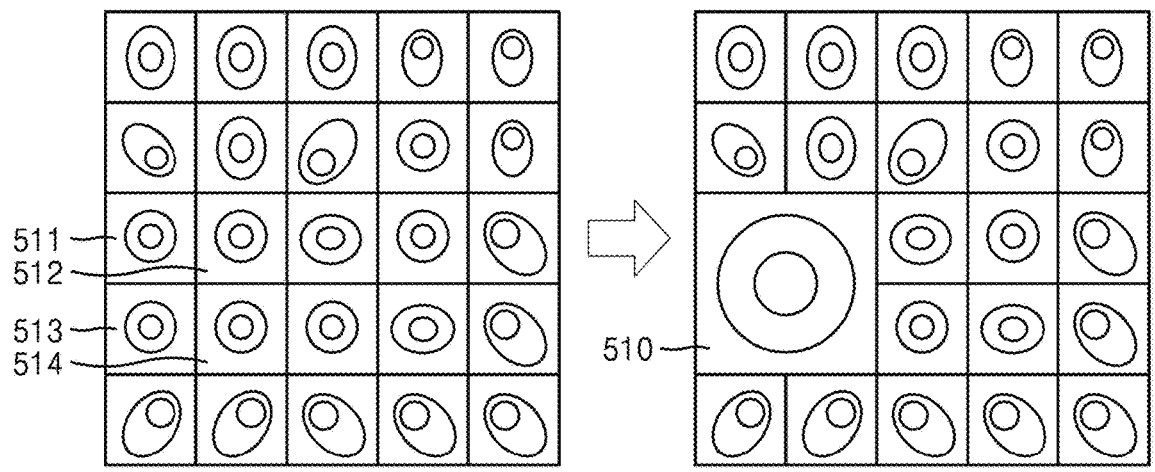
FIG. 5A illustrates merge of hologram plane segments according to an example embodiment.

FIG. 5A illustrates merge of hologram plane segments according to an example embodiment.

The processor may generate a merged hologram plane segment by merging multiple hologram plane segments.

The processor may generate a merged hologram plane segment by merging at least two hologram plane segments. For example, the processor may generate a merged hologram plane segment 510 by merging hologram plane segments 511, 512, 513 and 514 having relatively small aberrations.

The processor may generate a kernel corresponding to the merged hologram plane segment 510.

As the number of hologram plane segments increases, more processes may need to be in parallel. By reducing the number of hologram plane segments by merging two or more hologram plane segments, the load of parallel processing may decrease. Further, by merging the hologram plane segments considering the levels of aberrations, the accuracy in the aberration modeling may not be diminished.

Figure 5B:
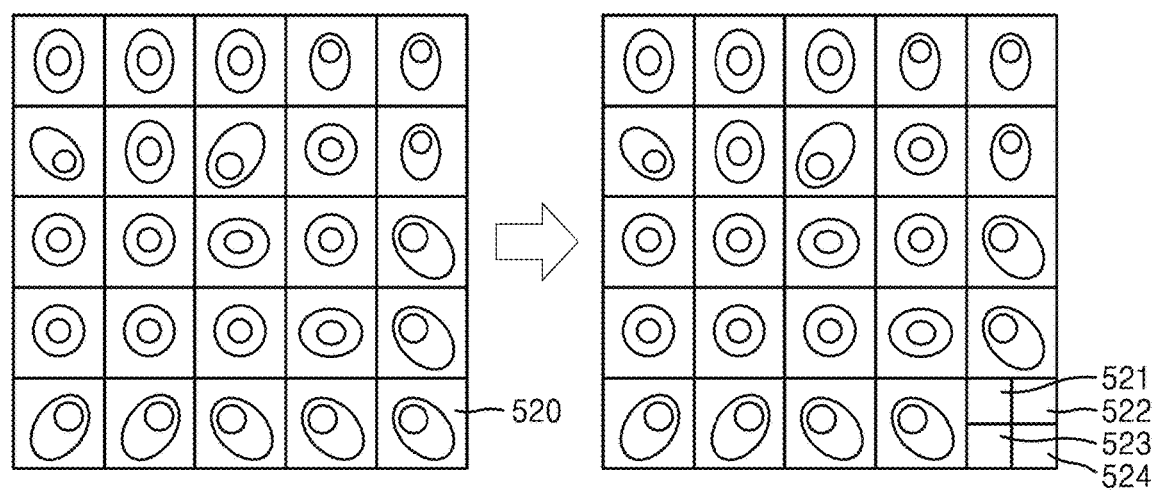
FIG. 5B illustrates division of hologram plane segments according to an example embodiment.

FIG. 5B illustrates division of hologram plane segments according to an embodiment.

The processor may generate divided hologram segments by dividing a hologram plane segment.

The processor may generate divided hologram plane segments by dividing at least one hologram plane segment. For example, the processor may generate divided hologram plane segments 521, 522, 523 and 524 by dividing a hologram plane segment 520 having relatively large aberration.

The processor may generate kernels respectively corresponding to the divided hologram plane segments 521, 522, 523 and 524. The modeling of the aberrations may be performed with high accuracy through spatial division for the modeling.

Figure 6:
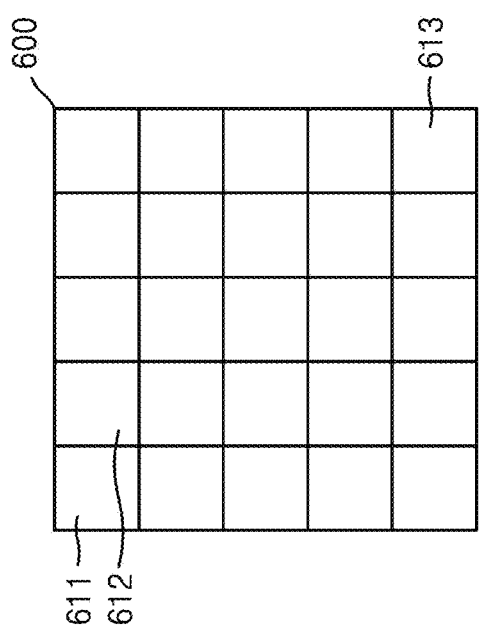
FIG. 6 illustrates masks according to an example embodiment.
Figure 6:
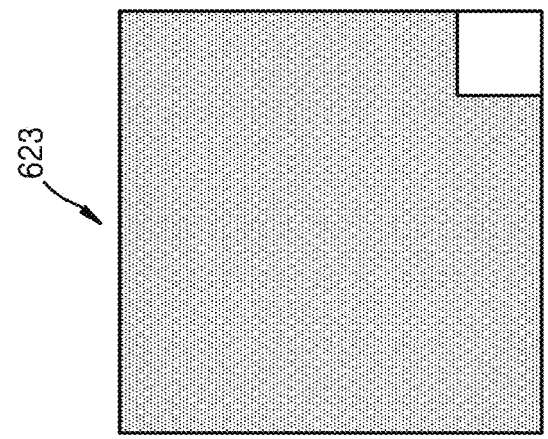
Figure 6:
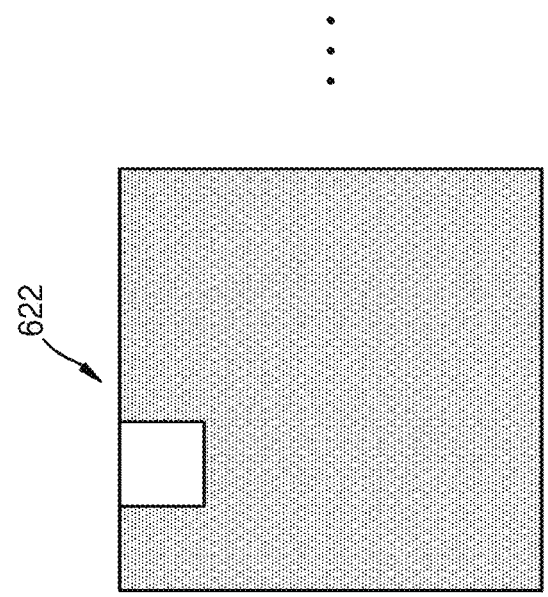
Figure 6:
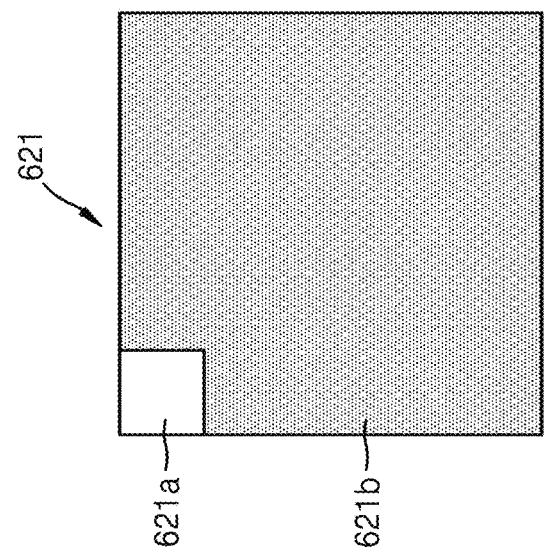

FIG. 6 illustrates masks 621 to 623 according to an example embodiment.

The processor may generate masks respectively corresponding to the hologram plane segments. For example, the processor may generate the mask 621 corresponding to a hologram plane segment 611 of a hologram plane 600, the mask 622 corresponding to a hologram plane segment 612, and the mask 623 corresponding to a hologram plane segment 613.

The mask 621 may include a pass area 621a corresponding to a hologram plane segment and a remainder cut-off area 621b. According to an example embodiment, the mask 621 may be a binary mask of which the pass area 621a has a pixel value of 1 and the cut-off area 621b has a pixel value of 0, but the disclosure is not limited thereto.

Figure 7A:
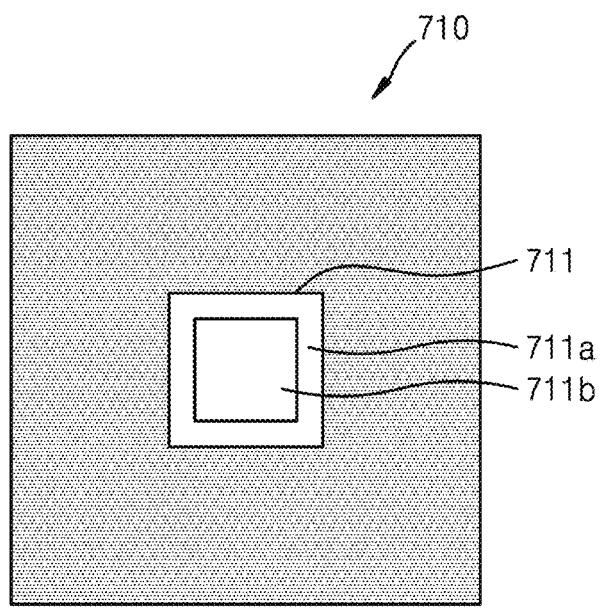
FIGS. 7A and 7B illustrate masks for a blurring process according to an example embodiment.
Figure 7B:
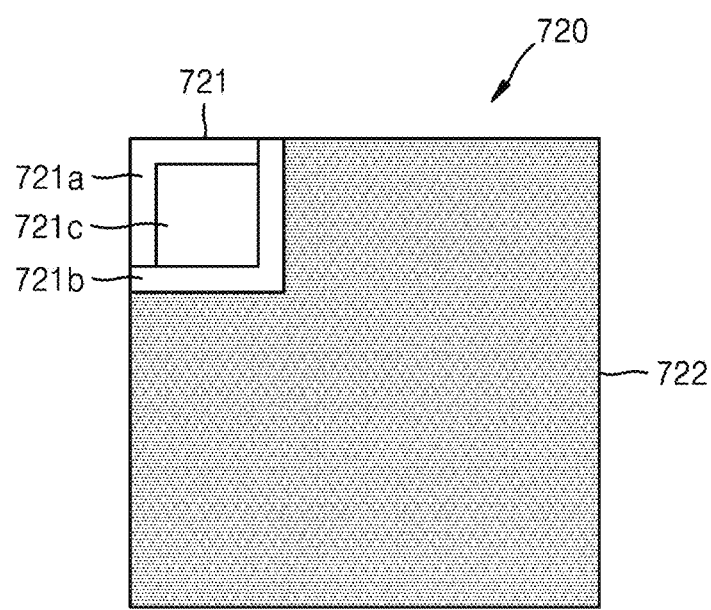

FIGS. 7A and 7B illustrate masks 710 and 720 for a blurring process according to an example embodiment.

With reference to FIG. 7A, the mask 710 may be configured to filter a hologram, allowing a hologram segment to have a soft edge. To this end, the mask 710 may have different pixel values for an edge area 711a of a pass area 711 and a central area 711b of the pass area 711 in an example embodiment. For example, the pixel value of the edge area 711a may be 0.8, and the pixel value of the central area 711b may be 1.

In addition to the descriptions given with reference to FIG. 7A, a variety of filtering methods for filtering a hologram, which allow a hologram segment to have a soft edge, may be used on the mask 710.

With a hologram segment having a soft edge, when image segments generated from hologram segments are combined, a boundary line between the image segments may be removed.

With reference to FIG. 7B, the mask 720 may be configured to filter a hologram, allowing a hologram segment neighboring another hologram segment to have a soft edge. An edge area 721b of a pass area 721, which adjoins a cut-off area 722, corresponds to a boundary between segments, and thus, may need to be blurred; however, as an edge area 721a of the pass area 721, which does not adjoin the cut-off area 722, does not correspond to a boundary between segments, it may not need to be blurred. To this end, in an embodiment of the mask 720, the edge area 721b, which adjoins the cut-off area 722, may have a different pixel value than that of a central area 721c, and the edge area 721a, which does not adjoin the cut-off area 722, may have the same pixel value as that of the central area 721c. For example, the pixel value of the edge area 721b, which adjoins the cut-off area 722, may be 0.8, and the pixel value of the edge area 721a, which does not adjoin the cut-off area 722, and the central area 721c may be 1.

Figure 8:
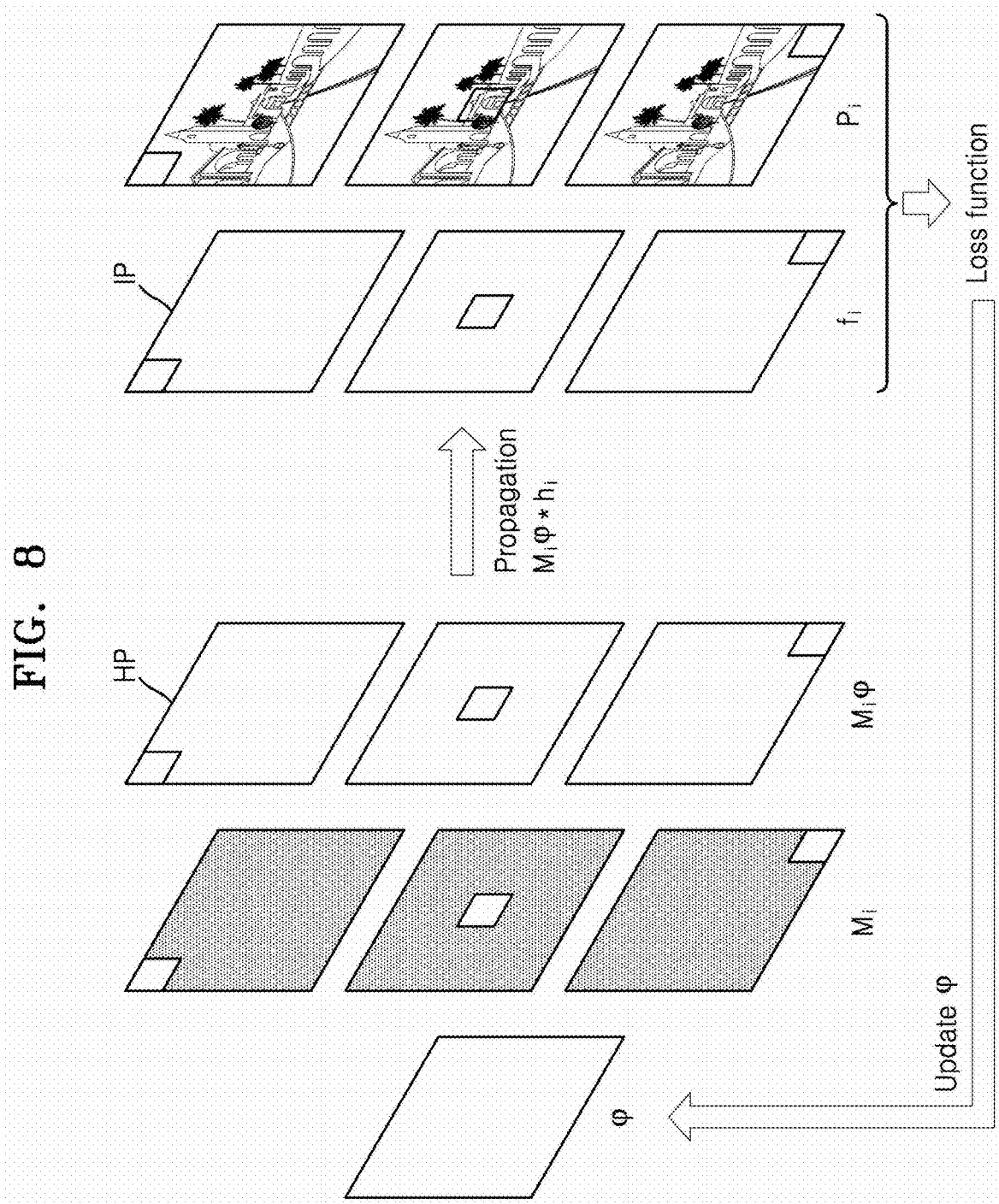
FIG. 8 illustrates an optimization loop for generating a hologram by compensating for aberrations of a holographic display device according to an example embodiment.

FIG. 8 illustrates an optimization loop for generating a hologram by compensating for aberrations of a holographic display device according to an example embodiment.

Prior to performing the optimization loop, the processor may generate N kernels ($h_i$) and N masks ($M_i$) corresponding to hologram plane segments. Further, the processor may generate a hologram ($\varphi$) with randomized phase data and amplitude data.

In the optimization loop, the processor may generate N hologram segments ($M_i\varphi$) by masking the hologram ($\varphi$), using the masks ($M_i$).

The processor may generate N image segments ($f_i$) by propagating the hologram segments ($M_i\varphi$) to the image plane IP from the hologram plane HP. The image segments may be obtained by propagating the hologram segments in parallel. Alternatively, the image segments may be obtained by propagating the hologram segments in series. The propagation may be performed by a convolution operation of the hologram segments ($M_i\varphi$) and the kernels ($h_i$). As aberrations respectively corresponding to the hologram plane segments are modeled in the kernels ($h_i$), by propagating the hologram segments ($M_i\varphi$) based on the kernels ($h_i$), the aberrations respectively corresponding to the hologram plane segments may be reflected, and then the hologram segments ($M_i\varphi$) may be propagated.

The processor may update the hologram ($\varphi$) to optimize a loss function defined by a difference between the image segments ($f_i$) and reference image segments. The reference image segments may be predetermined image segments ($P_i$). The predetermined image segments ($P_i$) may be obtained by spatially dividing a predetermined image same as the hologram plane HP. Alternatively, the predetermined image segments ($P_i$) may be obtained by masking the predetermined image by using the masks ($M_i$).

The loss function may be defined by a difference in intensities of the image segments ($f_i$) and the predetermined image segments ($P_i$). The loss function may be defined by a root mean square of the difference in intensities of the image segments ($f_i$) and the predetermined image segments ($P_i$). In an embodiment, the loss function may be defined as the following Equation 3.

$$L = \sum_{1}^{N}(I_f^i - I_P^i)^2 \qquad \text{[Equation 3]}$$

In Equation 3, L represents a loss function, $I_f^i$ represents an intensity of an image segment, and $I_P^i$ represents an intensity of a predetermined image segment.

In an embodiment, the hologram ($\varphi$) may be updated based on the following Equation 4.

$$\varphi = \varphi + b\left(\frac{\partial L}{\partial \varphi}\right) \qquad \text{[Equation 4]}$$

In Equation 4, b represents an arbitrary constant. As the kernels ($h_i$) are formed by using Zernike polynomials, the loss function may be differentiated. Accordingly, the hologram ($\varphi$) may be updated based on the Equation 4.

Figure 9:
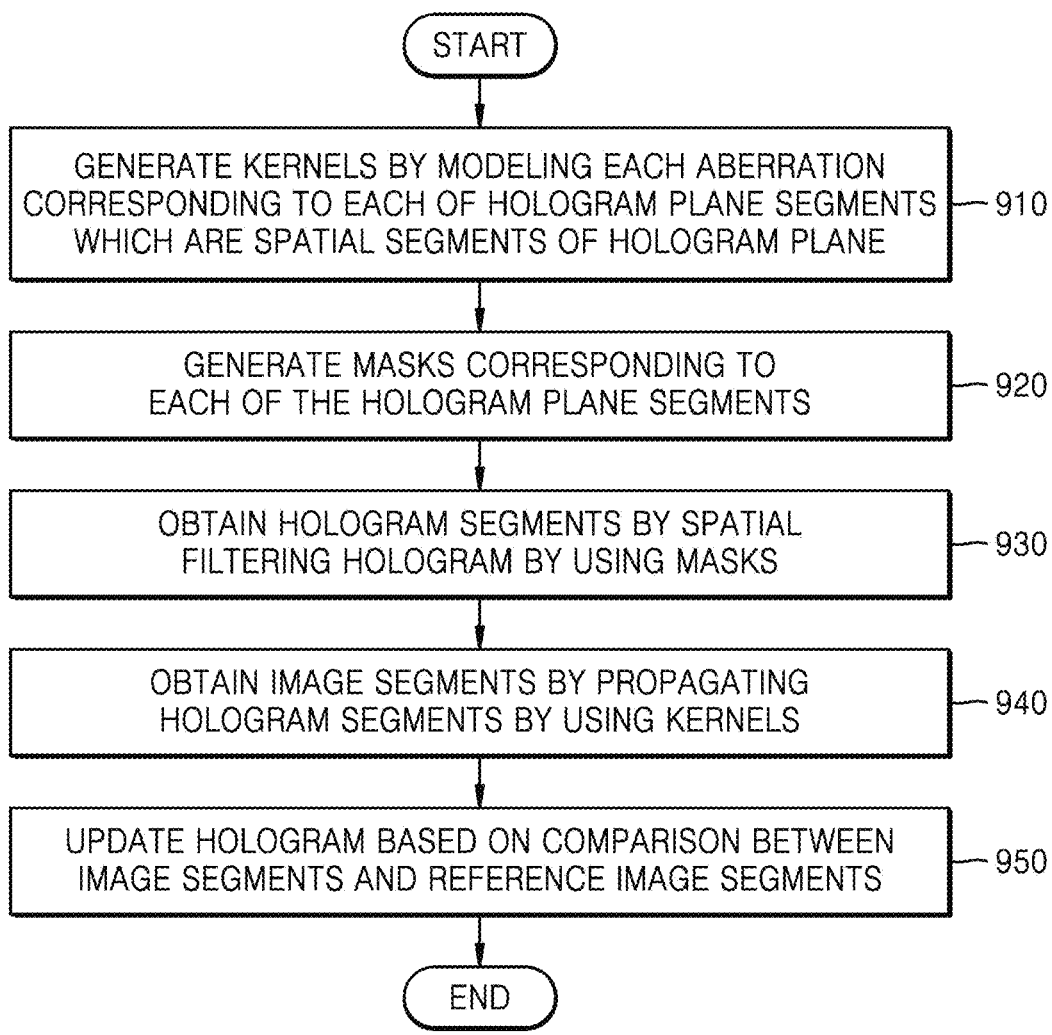
FIG. 9 illustrates a flowchart of a method for generating a hologram by compensating for aberrations of a holographic display device according to an example embodiment.

FIG. 9 illustrates a flowchart of a method for generating a hologram by compensating for aberrations of a holographic display device according to an example embodiment.

In operation 910, the processor may generate kernels by modeling each aberration corresponding to each of hologram plane segments, which are spatial segments of a hologram plane. The processor may generate kernels using Zernike polynomials.

The processor may merge or divide the hologram plane segments based on a level of aberrations. For example, the level of aberrations may be determined from a size of Zernike coefficients. As another example, the level of aberrations may be determined from the user's visual judgment. The processor may generate a kernel corresponding to a merged hologram plane segment and a kernel corresponding to a divided hologram plane segment.

In operation 920, the processor may generate masks respectively corresponding to the hologram plane segments. The mask may include a pass area corresponding to a hologram plane segment and a remainder cut-off area. Further, the mask may be generated where an edge area of the pass area has a different pixel value than that of a central area of the pass area, allowing the hologram segment to have a soft edge.

In operation 930, the processor may obtain hologram segments by spatial filtering a hologram by using the masks.

In operation 940, the processor may obtain image segments by propagating the hologram segments by using the kernels. The processor may propagate the hologram segment from the hologram plane to the image plane by a convolution operation of the kernels and the hologram segments. As aberrations are modeled in the kernel, the hologram segment may be propagated reflecting the aberrations.

In operation 950, the processor may update the hologram based on a comparison between the image segments and predetermined image segments. The processor may determine a loss function based on a difference in intensities of the image segment and the predetermined image segment, and update the hologram to optimize the loss function.

Figure 10:
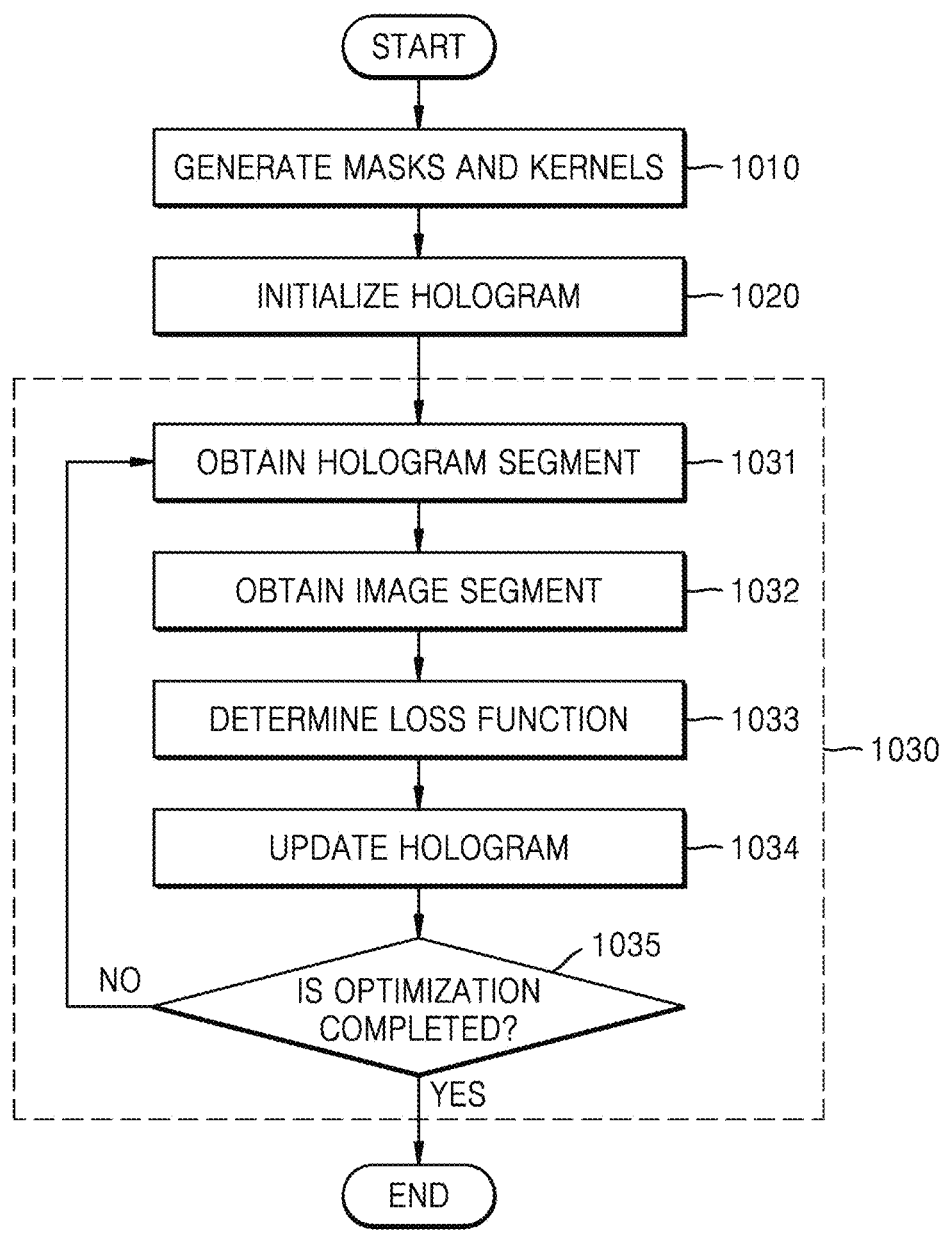
FIG. 10 illustrates a flowchart of a method for generating a hologram by compensating for aberrations of a holographic display device, including an example optimization loop, according to an embodiment.

FIG. 10 illustrates a flowchart of a method for generating a hologram by compensating for aberrations of a holographic display device, including an optimization loop 1030, according to an example embodiment.

Prior to performing the optimization loop 1030, in operation 1010, the processor may generate masks and kernels. In operation 1020, the processor may initialize a hologram. The hologram may be initialized to have arbitrary phase data and amplitude data.

In operation 1031, the processor may obtain hologram segments. The processor may obtain hologram segments by spatially dividing a hologram by using masks.

In operation 1032, the processor may obtain image segments. The processor may obtain the image segments by propagating the hologram segments by using kernels.

In operation 1033, the processor may determine a loss function. For example, the processor may determine a root mean square of a difference in intensities of image segments and predetermined image segments as the loss function.

In operation 1034, the processor may update a hologram. The processor may update the hologram to optimize the loss function.

In operation 1035, the processor may determine completion of optimization. The processor may determine completion of optimization based on a value of the loss function. According to an example embodiment, the processor may determine completion of optimization when the value of the loss function satisfies a reference value. Alternatively, the processor may determine completion of optimization based on the number of iterations of the optimization loop 1030. According to an example embodiment, the processor may determine completion of optimization when the number of iterations of the optimization loop 1030 satisfies a reference number.

Figure 11A:
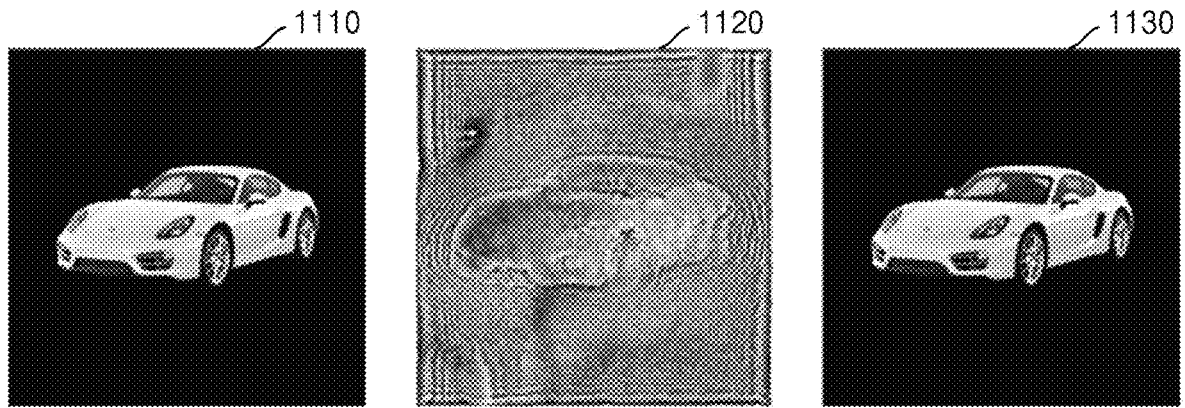
FIGS. 11A and 11B illustrate the results of an experiment employing a method for generating a hologram by compensating for aberrations of a holographic display device according to an example embodiment.
Figure 11B:
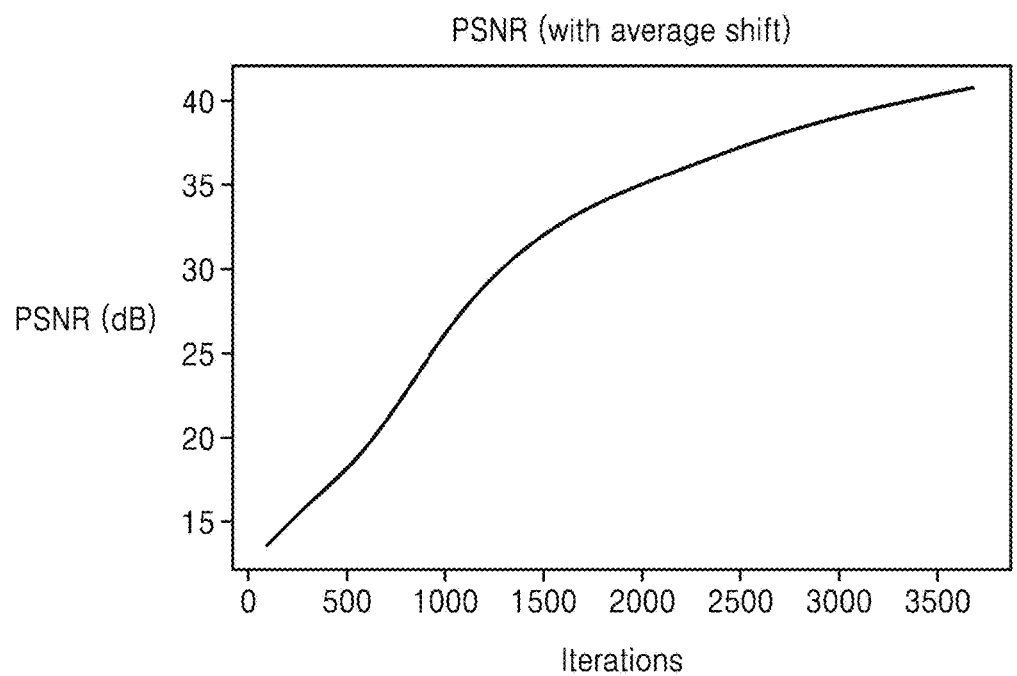

FIGS. 11A and 11B illustrate the results of an experiment employing a method for generating a hologram by compensating for aberrations of a holographic display device according to an embodiment.

In the experiment, a light source having a wavelength of 532 nm, a reference image 1110 having 512×512 pixels, and a spatial light modulator having a pixel distance of 3.6 μm are used. In addition, a propagation distance is set to 8 mm, and a hologram plane is spatially divided into a 5×5 array in the experiment. According to an example embodiment, the reference image 1110 is a predetermined image.

FIG. 11A illustrates the reference image 1110, a hologram 1120 generated to compensate for aberrations of a holographic display device based on a method according to an example embodiment, and a holographic image 1130 reproduced by the hologram 1120. FIG. 11B illustrates a graph of peak-signal ratio (PSNR) of the holographic image 1130 according to the number of iterations of the optimization loop.

With reference to FIGS. 11A and 11B, the holographic image 1130 of excellent quality hardly having no difference between the reference image 1110 and the holographic image 1130 is obtained. Further, by using hologram segments generated through filtering to have a soft edge, no boundary line has been generated between image segments in the holographic image 1130. The quality of the holographic image 1130 may also be supported by the PSNR.

The example embodiments may also be implemented in the form of a computer-readable recording medium including computer-executable commands, such as a computer module. The computer-readable recording medium may be any available medium which can be accessed by a computer, and include volatile and non-volatile media, and separable and non-separable media. Further, the computer-readable recording media may include both of computer storage media and communication media. The computer storage media may include volatile and non-volatile media, and separable and non-separable media, which are implemented by any method or technology for storing information, such as computer-readable commands, data structures, program modules, or other data. The communication media may typically include other data of modulated data signals, such as computer-readable commands, data structures, program modules, or other transmission mechanisms, and also include any information delivery media.

Also, in the disclosure, a "unit" may refer to a hardware component, such as a processor or a circuit, and/or a software component executed by a hardware component, such as a processor.

The above descriptions of the disclosure are provided merely as an example, and a person skilled in the art to which the present disclosure pertains may understand that the embodiments can be easily modified into other specific forms without changing technical ideas or essential technical features of the present disclosure. Therefore, it should be understood that the embodiments described above are provided as an example in every aspects, and thus do not pose a limitation on the present disclosure. For example, each component described as a single type component may be implemented in a dispersed manner, and similarly to this, components described as being dispersed may be implemented in an integrated manner.

The scope of the disclosure is not limited to the detailed description of example embodiments, and as such, the disclosure may be construed as encompassing all modifications or adaptions derived from the meaning and scope of the claims and their equivalent concepts.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A method for generating a hologram, the method comprising:
    generating kernels by modeling aberrations corresponding to hologram plane segments of a hologram plane;
    generating masks corresponding to the hologram plane segments of the hologram plane;
    obtaining hologram segments by spatial filtering the hologram by using the masks;
    obtaining first image segments by propagating the hologram segments by using the kernels; and
    updating the hologram based on a comparison between the first image segments and second image segments,
    wherein the hologram plane segments are generated by dividing the hologram plane into a plurality of spatial segments, and
    wherein the updating of the hologram comprises:
        determining a loss function based on a difference in intensities of the first image segments and the second image segments; and
        updating the hologram to optimize the loss function.

2. The method for claim 1,
wherein the generating of the kernels comprises:
modeling the aberrations corresponding to the hologram plane segments using Zernike polynomials; and
generating each of the kernels based on each of the Zernike polynomials.

3. The method for claim 2,
wherein the modeling of the aberrations corresponding to the hologram plane segments using each of the Zernike polynomials comprises determining Zernike coefficients for at least one hologram plane segment, among the hologram plane segments, by interpolating Zernike coefficients modeled for neighboring hologram plane segments, among the hologram plane segments.

4. The method for claim 1,
wherein the generating of the kernels comprises:
generating divided hologram plane segments by dividing at least one hologram plane segment among the hologram plane segments; and
generating the kernels based on the divided hologram plane segments.

5. The method for claim 1,
wherein the generating of the kernels comprises:
generating a merged hologram plane segment by merging at least two hologram plane segments among the hologram plane segments; and
generating a kernel, among the kernels, based on the merged hologram plane segment.

6. The method for claim 1,
wherein the generating of the masks comprises generating at least one mask including a pass area corresponding to a respective hologram plane segment and a remainder cut-off area.

7. The method for claim 6,
wherein the generating of the masks further comprises generating the at least one mask where an edge area of the pass area has a different pixel value than a central area of the pass area.

8. The method for claim 6,
wherein the generating of the masks further comprises generating the at least one mask where a first edge area of the pass area, which adjoins the cut-off area, has a different pixel value than a central area of the pass area, and a second edge area of the pass area, which does not adjoin the cut-off area, has a same pixel value as the central area of the pass area.

9. The method for claim 1,
wherein the obtaining of the first image segments comprises obtaining the first image segments by propagating the hologram segments in parallel.

10. The method of claim 1, wherein the hologram plane segments are spatial segments of the hologram plane.

11. The method of claim 1, wherein the second image segments are reference image segments acquired from a storage.

12. A non-transitory computer-readable recording medium having recorded thereon a computer program for executing a method for generating a hologram, the method comprising:
    generating kernels by modeling aberrations corresponding to hologram plane segments of a hologram plane;
    generating masks corresponding to the hologram plane segments of the hologram plane;
    obtaining hologram segments by spatial filtering the hologram by using the masks;
    obtaining first image segments by propagating the hologram segments by using the kernels; and
    updating the hologram based on a comparison between the first image segments and second image segments,
    wherein the hologram plane segments are generated by dividing the hologram plane into a plurality of spatial segments,
    wherein the updating of the hologram comprises:
        determining a loss function based on a difference in intensities of the first image segments and the second image segments; and
        updating the hologram to optimize the loss function.

13. A holographic display system comprising:
    a light source configured to emit light to reproduce a holographic image;
    an optical system configured to spatially focus the holographic image;
    a processor configured to generate a hologram configured to reproducing the holographic image; and
    a spatial light modulator configured to modulate the light based on the hologram,
    wherein the processor is configured to:
        generate kernels by modeling each aberration corresponding to each of hologram plane segments of a hologram plane;
        generate masks respectively corresponding to the hologram plane segments of the hologram plane;
        obtain hologram segments by spatial filtering the hologram by using the masks;
        obtain first image segments by propagating the hologram segments by using the kernels; and update the hologram based on a comparison between the first image segments and second image segments, wherein the hologram plane segments are generated by dividing the hologram plane into a plurality of spatial segments, and wherein the processor is further configured to determine a loss function based on a difference in intensities of the first image segments and the second image segments, and update the hologram to optimize the loss function.

14. The holographic display system of claim 13, wherein the processor is further configured to perform the modeling of the aberrations corresponding to the hologram plane segments using Zernike polynomials, and generate each of the kernels based on each of the Zernike polynomials.

15. The holographic display system of claim 14, wherein the processor is further configured to determine Zernike coefficients for at least one hologram plane segment, among the hologram plane segments, by interpolating Zernike coefficients modeled for neighboring hologram plane segments, among the hologram plane segments.

16. The holographic display system of claim 13, wherein the processor is further configured to generate divided hologram plane segments by dividing at least one hologram plane segment, among the hologram plane segments, and generate the kernels based on the divided hologram plane segments.

17. The holographic display system of claim 13, wherein the processor is further configured to generate a merged hologram plane segment by merging at least two hologram plane segments, among the hologram plane segments, and generate a kernel, among the kernels, based on the merged hologram plane segment, among the hologram plane segments.

18. The holographic display system of claim 13, wherein the processor is further configured to generate at least one mask including a pass area corresponding to a respective hologram plane segment and a remainder cut-off area.

19. The holographic display system of claim 18, wherein the processor is further configured to generate the at least one mask where an edge area of the pass area has a different pixel value than a central area of the pass area.

20. The holographic display system of claim 13, wherein the processor is configured to obtain the first image segments by propagating the hologram segments in parallel.

21. A holographic display device comprising:

a memory storing one or more instructions; and a processor configured to execute the one or more instructions to:

generate kernels corresponding to hologram plane segments of a hologram plane;

generate one or more masks corresponding to the hologram plane segments;

obtain one or more hologram segments by applying the one or more masks on a hologram;

obtain one or more image segments by propagating the one or more hologram segments based on one or more kernels among the kernels; and update the hologram based on a comparison between the one or more image segments and one or more reference image segments, wherein the hologram plane segments are generated by dividing the hologram plane into a plurality of spatial segments, and wherein the processor is further configured to determine a loss function based on a difference in intensities of the one or more image segments and the one or more reference image segments, and update the hologram to optimize the loss function.

* * * * *